J. A. Edwards.
Cheese Vat.

Nº 82,698. Patented Oct. 6, 1868.

Witnesses:
Wm A. Morgan
G. C. Colton

Inventor:
J. A. Edwards
per Munn & Co
Attorneys.

United States Patent Office.

JOHN A. EDWARDS, OF WATERFORD, PENNSYLVANIA.

Letters Patent No. 82,698, dated October 6, 1868.

IMPROVEMENT IN MILK-VATS.

The Schedule referred to in these Letters Patent and making part of the same.

TO ALL WHOM IT MAY CONCERN:

Be it known that I, JOHN A. EDWARDS, of Waterford, in the county of Erie, and State of Pennsylvania, have invented a new and useful Improvement in Milk-Vats; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
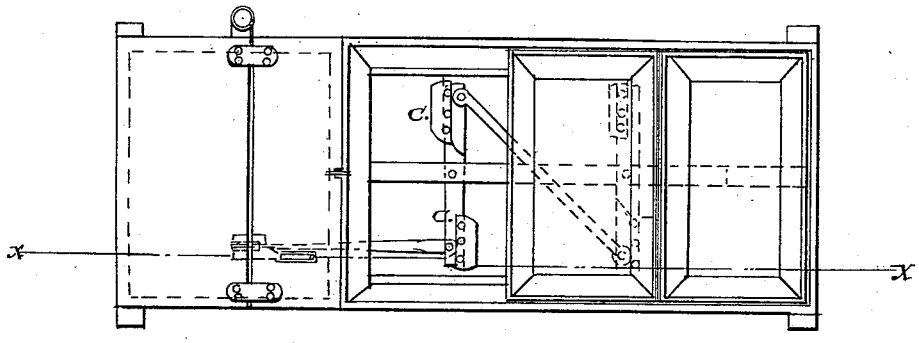
Figure 1 represents a plan view of my improved apparatus.
Figure 2:
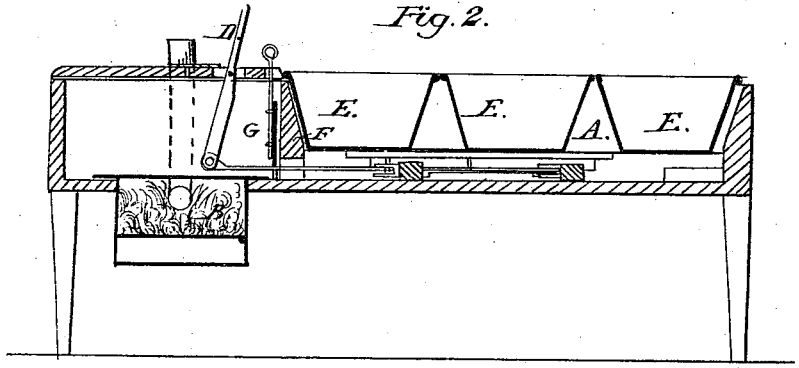
Figure 2 represents a section of the same, on the line $x\ x$ of fig. 1.

The nature of this invention relates to improvements in milk-vats, such as are designed to facilitate the formation of cream, the object of which is to improve the same.

It consists of a vat, whereon the milk is to be set, and in which water is used, provided with a heater for governing the temperature of the water, and an agitater, whereby the water is caused to circulate freely under the milk-pans, which are suspended in suitable numbers above the water of the vat, or so that they come into contact with the water.

The said vat is provided with a gate, to separate the part of the vat to which the heater is connected from the part where the water communicates with the pans, when desired.

In the drawings, A represents a water-vat, preferably of rectangular form, which is provided at one end with a heater, B.

C represents vibrating paddles, suitably arranged near the bottom of the vat, to be actuated by the hand-lever D.

E represents pans, for containing the milk, resting in the top of the vat on suitable supports provided therein for the purpose.

F represents a bulk-head in the vat, between the part to which the heater is fixed and the part where the pans are placed, provided with a gate, G, to shut off the flow of water from one part to another, when desired.

It is considered that the arrangement of the vat, whereby any suitable number of small pans may be readily set therein, is an important feature, as where one large vat is used, which may be of sufficient capacity when a dairy is producing its maximum quantity of milk, it is entirely too large and inconvenient when the production is materially reduced; whereas, by my arrangement, any suitable number of pans may be used, to suit the quantity of milk produced. Moreover, it is highly desirable to set the milk in earthen pans for raising cream, which pans are of small size, and which my improved vat is particularly designed for.

By means of the heater, gate, and agitater, it will be perceived that any desired temperature can with great facility be maintained in the vat, and communicated to the milk in the pans by the water.

Having thus described my invention, I claim as new, and desire to secure by Letters Patent—

The described arrangement, within the milk-vat, of the agitaters C C, lever D, bulk-head F, gate G, and furnace B, as herein described, for the purpose specified.

JOHN A. EDWARDS.

Witnesses:
C. W. L. ANDERSON,
L. N. SEDGWICK.